United States Patent [19]

Ziemek et al.

[11] Patent Number: 4,811,888

[45] Date of Patent: Mar. 14, 1989

[54] METHOD AND APPARATUS FOR MANUFACTURING SMALL DIAMETER, THICK WALLED, CABLE SHEATHS

[75] Inventors: Gerhard Ziemek; Harry Staschewski, both of Langenhagen; Ewald Gunia, Hannover, all of Fed. Rep. of Germany

[73] Assignee: Kabelmetal Electro GmbH, Hannover, Fed. Rep. of Germany

[21] Appl. No.: 241,598

[22] Filed: Sep. 8, 1988

[30] Foreign Application Priority Data

Oct. 26, 1987 [DE] Fed. Rep. of Germany ....... 3736123

[51] Int. Cl.$^4$ ............................................. H04B 9/00
[52] U.S. Cl. ..................... 228/148; 228/17.5; 228/156; 228/222; 228/46; 219/60 R; 219/61.7
[58] Field of Search ............. 228/148, 17.5, 156, 228/173.7, 222, 46; 219/60 R, 61.6, 61.7; 29/820

[56] References Cited

U.S. PATENT DOCUMENTS

| | | | |
|---|---|---|---|
| 2,029,044 | 1/1936 | Westlinning | 219/61.7 |
| 3,017,494 | 1/1962 | Mackey | 219/61.7 |
| 3,491,721 | 1/1970 | Gill et al. | 228/17.5 |
| 3,931,489 | 1/1976 | Roderburg et al. | 219/60 R |
| 4,711,388 | 12/1987 | Winter et al. | 228/148 |
| 4,734,981 | 4/1988 | Ziemek | 228/17.5 |
| 4,759,487 | 7/1988 | Karlinski | 228/148 |

FOREIGN PATENT DOCUMENTS 211711 12/1966 U.S.S.R. ............................ 219/61.7

Primary Examiner—Nicholas P. Godici
Assistant Examiner—Samuel M. Heinrich
Attorney, Agent, or Firm—James C. Jangarathis

[57] ABSTRACT

There is disclosed a method and apparatus for manufacturing a small diameter, thick walled, cable sheath by controllably driving a metal strip in a longitudinal direction while it is trimmed and formed into a hollow tubular member; continuously welding the longitudinal abutting edges of the hollow tubular member in association with cooling the tubular member in the vicinity of the welding by surrounding at least 60% of its circumference with a coolant, while maintaining the resulting longitudinal welded seam free of the coolant; and continuously drawing the cooled hollow tubular member in the same direction as the metal strip is driven.

12 Claims, 3 Drawing Sheets

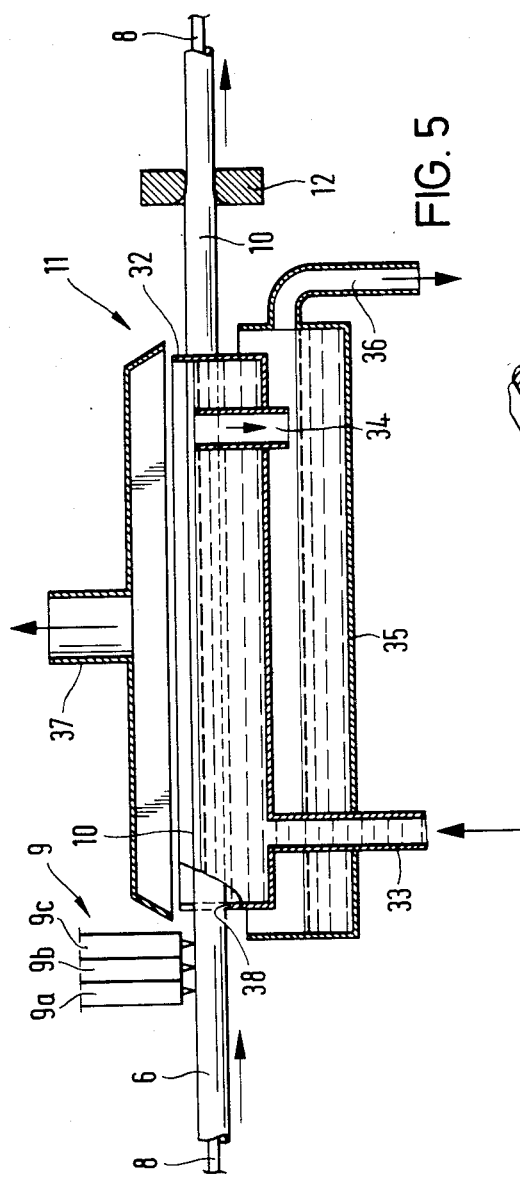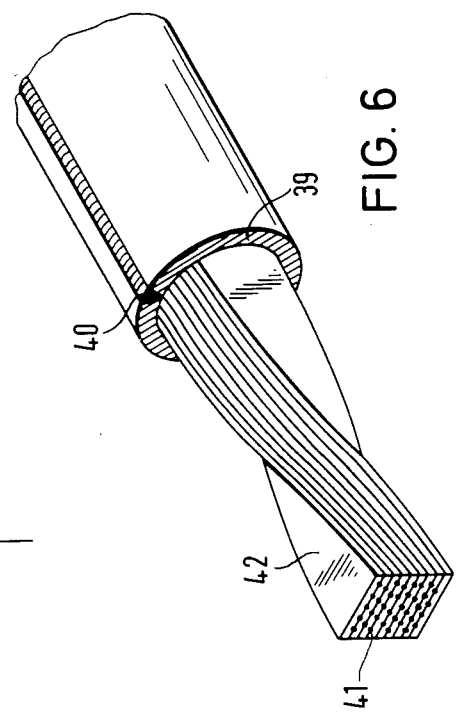

METHOD AND APPARATUS FOR MANUFACTURING SMALL DIAMETER, THICK WALLED, CABLE SHEATHS

The invention relates to method and apparatus for manufacturing small diameter, thick walled, cable sheaths. Further, the invention relates to such cable sheaths positioned about optical conductors to form the principal components of light conducting, submarine cables.

BACKGROUND OF THE INVENTION

It is priorly known to manufacture cable sheaths by the steps of continuously drawing a metal strip in a longitudinal direction through a plurality of forming rollers to form a hollow tubular sheath and then continuously welding the longitudinal abutting edges of the hollow tubular member. Further, it is known to form the metal strip around a cable core prior to the step of continuously welding the longitudinal abutting edges of the sheath. Additionally, it is known to include in such cable core a plurality of electrical and/or optical conductors. As to cable sheaths for submarine cables, the aforesaid steps have generally been unsuitable in that the sheaths so formed could not withstand pressures of more than 100 BAR.

In the case of submarine cables comprising optical conductors for transoceanic transmissions, the optical conductors must be shielded from the great pressures of the deep ocean depths while bridging extensive distances. To compensate for signal attenuation along the optical conductors, amplifiers along the submarine cable are required. To energize the amplifiers, power may preferably be supplied thereto by way of the cable sheaths if they are comprised of electrical conductive metal, for example, copper or aluminum, and if their wall thicknesses are adequate to conduct the power over long distances without resulting in significant resistance heating. It is desirable to have a thick walled, cable sheath that shields the optical conductors from pressures up to 1000 BAR at deep ocean depths; while supplying power to interdispersed amplifiers without resistance heating the sheath to a level that would damage the optical conductors included therein. Further, because of the pressure load on the submarine cable at deep ocean depths, the outer diameter of the cable sheath should be kept to a minimum, especially in view of the additional requirement that the submarine cable be produced in long lengths.

OBJECTS OF THE INVENTION

An object of the invention is to provide a novel method and apparatus for manufacturing cable sheaths that can withstand pressures of up to 1000 BAR.

Another object of the present invention is to provide a novel method and apparatus for manufacturing submarine cables comprising optical conductors, such cables including cable sheaths having wall thicknesses that can support the transmission of power to interdispersed amplifiers over extensive distances without significant resistance heating effects.

Still another object of the present invention is to provide a novel method and apparatus for manufacturing light conducting, submarine cables having cable sheaths with an outer diameters of between 5 and 25 mm, and wall thicknesses of 0.2 to 2.5 mm.

SUMMARY OF INVENTION

The continuous manufacture of longitudinally welded, cable sheaths having outer diameters of between 5 and 25 mm, and wall thicknesses of 0.2 to 2.5 mm was not possible with the prior art techniques. The forces required to form a metal strip of a thickness between 0.2 to 2.5 mm and a width of between 15 and 80 mm, into a tubular configuration were so great that all attempts to draw such a strip solely by drawing apparatus located downstream of the welding station resulted in the tearing of the metal strip.

Additionally, because of the extensive power required to weld cable sheaths whose wall thickness is between 0.2 and 2.5 mm, and because of the relatively small outer diameter dimension of between 5 and 25 mm, the employment of prior art welding procedures caused excessive total cross section heating of the cable sheath even though only the longitudinal edges of the sheath were within the welding bath of the polyarc welding device. In some cases a red heat condition prevailed in the vicinity of the welding with the cable sheath losing its ability to withstand the drawing forces applied thereto.

The aforesaid impediments of the prior art are obviated, and the objects of the present invention are achieved, by controllably driving the metal strip in a longitudinal direction while it is trimmed and formed into a hollow tubular member; continuously welding the longitudinal abutting edges of the hollow tubular member in association with cooling the tubular member in the vicinity of the welding by surrounding at least 60% of its circumference with a coolant, while maintaining the resulting longitudinally welded seam free of the coolant; and continuously drawing the cooled hollow tubular member in the same direction as the metal strip is driven.

BRIEF DESCRIPTION OF THE DRAWINGS

A better understanding of the present invention as well as the objects and advantages thereof will become apparent upon consideration of the following detailed disclosure thereof, especially when taken with the accompanying drawings; wherein:

FIG. 5 is a side, schematic view of a polyarc welding device and a cable cooling apparatus employed in the apparatus of FIG. 1.

FIG. 6 is a schematic view of a thick walled, cable sheath formed about a plurality of optical fiber, light conductor units.

Referring to FIG. 1, as a aluminum strip 2 of, for example 25 mm width and a wall thickness of 1.1 mm is drawn from a supply drum 1, passed through a degreasing bath 3, and into an input side of a driven trimming device 4 that trims the edges of the aluminum strip 2 to assure a uniform width and oxide free edges for subsequent longitudinal seam welding thereof. From the driven trimming devices 4, the trimmed aluminum strip 2 is passed into an input side of a plurality of forming rollers 5. The spacial positioning of the forming rollers 5, the curvature of the individual rollers and the thickness and width of the aluminum strip 2 are such as to form the aluminum strip 2 into a closed tubular sheath 6. A first forming stage of the forming rollers 5 is comprised of a driven forming device 7, while the subsequent forming stages of the forming rollers 5 comprise cone shaped tubes and rings of a type priorly known.

Figure 1:
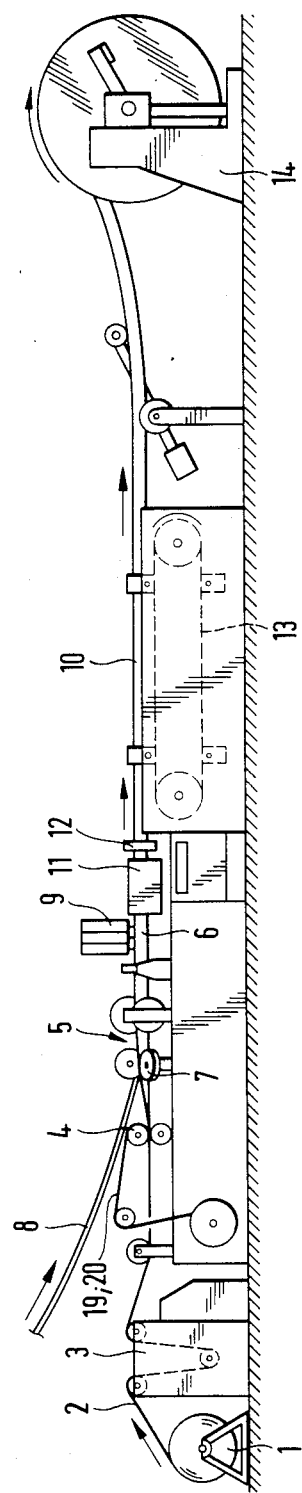
FIG. 1 is a diagrammatic representation of apparatus in accordance with the instant invention for manufacturing improved cables.

Concurrently, a cable core 8 comprised, for example, of a plurality of light conductor unit 42, each including a plurality of optical fibers 41 extending parallel to each other between support tapes, is longitudinally drawn from a supply drum (not shown) toward and into the front end of the driven forming device 7. Thus, the cable core 8 is axially positioned within the tubular sheath 6 as the aluminum strip 2 is formed into such sheath by its passage through the plurality of forming rollers 5.

At the output side of the forming rollers 5 there is positioned a polyarc welding device 9 for welding the adjacent end faces of the longitudinally abutting edges of the tubular sheath 6 as such sheath is continuously drawn past such welding device. The polyarc welding device 9 employs well known welding techniques conducted in an inert gas environment. Immediately adjacent to the polyarc welding device 9 is a cable cooling apparatus 11 for intensely cooling a major portion of the circumferential surface of the welded tubular sheath 10 as such sheath is continuously drawn through such apparatus.

After the cable cooling apparatus 11 there are successively: a draw down die 12 for reducing the outer diameter of the welded tubular sheath 10, thus enabling the use of an aluminum strip 2 of greater width for a desired small diameter sheath; a capstan draw apparatus 13; and a take-up drum 14. The capstan draw apparatus is of a priorly known type (see for example, U.S. Pat. Nos. 3,085,729; 3,116,865; and 3,128,930) for periodically gripping and transversely moving the welded tubular sheath 10 in a longitudinal path. There is included in the capstan draw apparatus 13 a plurality of gripper assemblies, each including a pair of clamping elements (not shown) for moving each of the gripper assemblies in an elongated endless path. Each of the gripper assemblies periodically engages a portion of the outer circumferential surface of the welded tubular sheath 10 for retaining a tight circumferential grip on the sheath so as to prevent slipping or turning of the sheath.

In priorly known equipments for making longitudinally welded, tubular sheaths the metal strips were continuously drawn from a supply drum, through a forming station and then a welding station by tension forces applied solely by a capstan draw apparatus located downstream of the welding station. In the instant case wherein the longitudinally welded, tubular sheath has a thick wall between 0.2 and 2.5 mm, and a small outer diameter between 5 and 25 mm, the magnitude of the forces required to form the thick metal strip into a tubular configuration is so great that any attempt to draw the tubular sheath solely by a capstan draw apparatus located downstream of the welding station would result in the destruction or tearing of the metal strip. Consequently, in the apparatus of the instant invention, the forming of the thick metal strip into a tubular configuration is performed in a plurality of stages, the first of which involves the driven forming device 7 that drives the aluminum strip 2 through the forming rollers 5, thus alleviating the magnitude of the drawing forces required of the capstan draw apparatus. In addition, because of the extensive power required to longitudinally weld the thick walled, tubular sheath, and because of the small diameter of such tubular sheath, intensive cooling of the tubular sheath is required in the area of the welding device to prevent such sheath from losing tensile strength.

In the apparatus of FIG. 1, the trimming device 4 and the first forming device 7 are each controllably driven. In particular, the driven trimming device 4 and the driven forming device 7, apply longitudinal forces to the aluminum strip 2 (in the direction of the polyarc welding device 9) as it is being formed into a tubular configuration, thus reducing the magnitude of the pulling forces that need be applied by the capstan draw apparatus 13. Further, to insure that the cross section of the welded tubular sheath 10 can withstand tension forces applied to such sheath by the capstan draw apparatus 13 in the vicinity of the polyarc welding device 9, the cable cooling apparatus 11 substantially limits the weld heating of the cross section of the tubular sheath 10 to the vicinity of the welded longitudinal seam.

Figure 2:
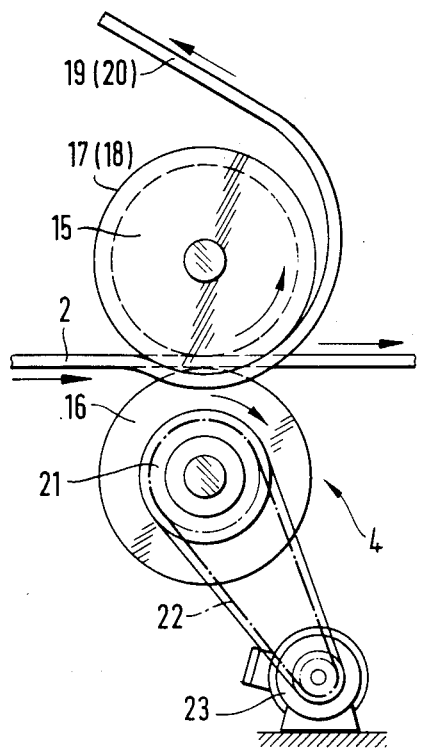
FIG. 2 is a side, schematic view of a driven trimming device employed in the apparatus of FIG. 1.
Figure 3:
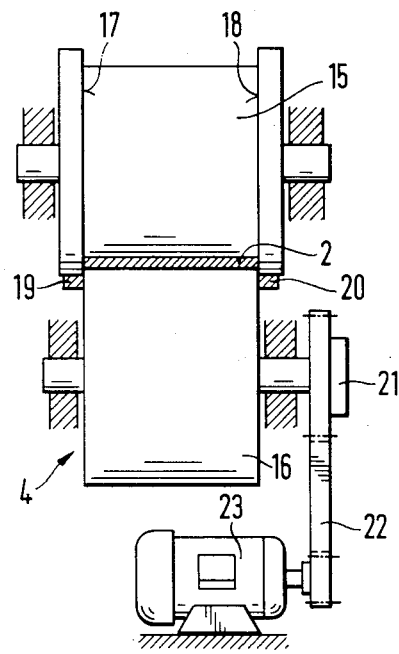
FIG. 3 is an end, schematic view of the driven trimming device of FIG. 2.

Referring to FIG. 2 and 3 the driven trimming device 4 comprises two cutting rollers 15 and 16 through which the aluminum strip 2 is fed. Cutting roller 15 includes two cutting edges 17 and 18 which, in combination with roller 16, cut off side edges 19 and 20 of the aluminum strip 2 in a known conventional manner. Cutting roller 16 includes a belt drive disk 21, and a drive belt 22 coupled to a drive motor 23.

Figure 4:
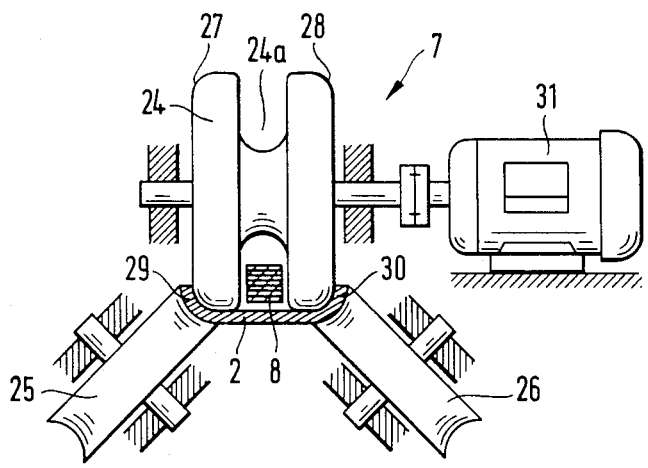
FIG. 4 is an end, schematic view of a driven forming device employed in the apparatus of FIG. 1.

As illustrated in FIG. 4, the driven forming device 7 comprises a forming roller 24 and a pair of support rollers 25 and 26. The forming roller 24 comprises two edge flanges 27 and 28 on its circumferential face, each having a radius of curvature substantially the same as the inside radius of the tubular sheath 10, and further includes a recess 24a in the center of its circumferential face for inserting the cable core 8 therethrough. As the aluminum strip 2 passes through the driven forming device 7, the combination of the forming roller 24 and the support rollers 25 and 26, bend the longitudinal edge areas 29 and 30 of the aluminum strip 2 to a desired curvature. Coupled to the forming roller 24 is a drive motor 23. The speed control of the drive motor 31 of the driven forming device 7, and the speed control of the drive motor 23 of the driven trimming device 4 are performed in accordance with the operational speed of the capstan draw apparatus 13, in a manner to avoid relative movement between the driven cutter roller 16, or the driven forming roller 24, and the aluminum strip 2.

Referring to FIG. 5, there is illustrated a polyarc welding device 9 and, immediately adjacent thereto, a cable cooling apparatus 11, and a draw down die 12, as employed in the apparatus of FIG. 1. The polyarc welding device 9 includes three welding electrodes 9a, 9b and 9c which in combination produce an elongated welding bath in the portion of the longitudinal edges of the tubular sheath 6 passing thereunder. Though not illustrated in FIG. 5, polyarc welding device 9 includes an enclosure positioned about the welding electrodes 9a, 9b and 9c and the welding bath for limiting the environment therein to an inert gas. The cable cooling apparatus comprises an elongated water cooler 32 through which the welded, tubular sheath 10 is continuously drawn; an overflow water container 35 positioned below the water cooler 32 for receiving discharged water by way of an overflow pipe 34 from the water cooler 32; and a vacuum cover 37 positioned above the water cooler 32. The water cooler 32 includes a water inlet pipe 33 for the provision of fresh, cool water. Depending on the temperature of the water in the overflow water container 35, such water may be recycled into the water cooler 32 by way of the water inlet pipe 33, or discharged from the cable cooling apparatus 11 by way of a water discharge pipe 36. Connected to the vacuum cover 37 is a vacuum pump (not illustrated) for creating a slight vacuum above the water in the water cooler 32. This slight vacuum prevents steam generated within the water cooler 32 from passing through a sheath entrance aperture 38 of the water cooler 32, and backing into the vicinity of the welding bath of the polyarc welding device 9. To achieve immediate and efficient cooling of the tubular sheath 10 in the area of the sheath immediately adjacent to the longitudinal edges being welded, the portion of the sheath within the water cooler 32 is surrounded by the cooling water to a level that is just shy of the longitudinal welded seam. The water level of the water cooler 32 is set in a manner that at least 60% of the circumferential surface of the welded tubular sheath 10 within the water cooler is surrounded by the cooling water, while the longitudinal welded seam is maintained water free. Further, the input side of the water cooler 32 is positioned in the immediate vicinity of the welding electrode 9c of the polyarc welding device 9 so as to provide a cooling by heat conduction of the portion of the tubular sheath 10 being welded. A heat sink is achieved for conducting heat away from that portion of the small diameter tubular sheath being welded.

FIG. 6 depicts an exemplary cable that was manufactured with the employment of the method and apparatus of the present invention. Such cable comprised a small diameter thick walled, tubular sheath 39 formed about a cable core comprising a plurality of ribbon-type light conductor units 42. The sheath was comprised of aluminum, having a wall thickness of 0.8 mm and an outer diameter of 8 mm. Each of the light conductor units 42 were comprised of a plurality of optical fibers 41 extending parallel to each other between support tapes. A plurality of the light conductor units 42 were positioned upon each other and the combination was twisted about the longitudinal axis of the cable for permitting thermal expansion or contraction of the optical fibers 41. The tubular sheath 39 provided an electrical conduction path for the energization of light amplifiers periodically disposed along the cable while providing high pressure resistance and high tensile strength. The longitudinally welded seam 40 of the tubular sheath 39 was the result of welding the total surface of the end faces of the longitudinal edges of the sheath. In the case of extremely thick walled, tubular sheaths such total surface welding would not be achievable. Under such circumstance, the longitudinal edges of the metal strip would be bevelled immediately after the trimming step.

Further processing of the tubular sheath 39 may comprise the application of a plastic covering for corrosion protection. Additionally, in the case wherein the tubular sheath 39 is to serve as an inner conductor of a coaxial cable, it may be surrounded with a plastic separation device and a metallic, tubular outer conductor.

While the invention has been described in connection with an exemplary embodiment thereof, it will be understood that many modifications will be apparent to those of ordinary skill in the art and that this application is intended to cover any adaptations or variation thereof. Therefore, it is manifestly intended that the inventions be only limited by the claims and equivalents thereof.

What is claimed:

1. Method for manufacturing a cable sheath, comprising the steps of:
    controllably driving a metal strip in a first longitudinal direction;
    continuously trimming the side edges of the metal strip;
    continuously forming the trimmed metal strip into a hollow tubular member;
    continuously welding longitudinally abutting edges of the hollow tubular member;
    continuously cooling the hollow tubular member in the vicinity of the welding by surrounding at least 60% of its circumferential surface with a coolant, while maintaining the resulting longitudinal welded seam free of the coolant; and
    continuously drawing the cooled hollow tubular member in said first longitudinal direction.

2. Method in accordance with claim 1, wherein said metal strip is controllably driven by a motor driven, trimming device.

3. Method in accordance with claim 1, wherein the metal strip is controllably driven by a motor driven, forming device.

4. Method in accordance with claim 1, further comprising the step of continuously reducing the diameter of the hollow tubular member after the continuous cooling thereof.

5. Method in accordance with claim 1, further comprising the step of continuously bevelling the longitudinal edges of the trimmed metal strip.

6. Apparatus for manufacturing a cable sheath comprising:
    means for controllably driving a metal strip in a first longitudinal direction;
    means for continuously trimming the side edges of the metal strip;
    means for continuously forming the trimmed metal strip into a hollow tubular member;
    means for continuously welding longitudinal abutting edges of the hollow tubular member;
    means for continuously cooling the tubular member in the vicinity of the welding by surrounding at least 60% of its circumferential surface within a coolant, while maintaining the welded abutting edges free of the coolant; and
    means for continuously drawing the cooled hollow tubular member in said first longitudinal direction.

7. Apparatus in accordance with claim 6, wherein said continuous trimming means comprises a plurality of cutting rollers, and said controllable driving means includes a first drive motor coupled to at least one of said cutting rollers.

8. Apparatus in accordance with claim 6, wherein said continuous forming means includes a plurality of forming rollers, and said controllable driving means includes a second drive motor coupled to at least one of said forming rollers.

9. Apparatus in accordance with claim 6, wherein said continuous trimming means and said continuous forming means are each motor driven by said controllable driving means.

10. Apparatus in accordance with claim 6, wherein said continuous cooling means comprises a water container through which the welded tubular sheath is continuously drawn, said water container being positioned immediately adjacent to the output side of said continuous welding means and having height adjustment mechanisms for adjusting water levels therein.

11. Apparatus in accordance with claim 10, wherein said continuous cooling means further comprises a vacuum cover positioned above said water container and connected to a vacuum source.

12. Apparatus in accordance with claim 6, further comprising a draw down means for reducing the outer diameter of the tubular sheath, said draw downs means being positioned between said continuous cooling means and said continuous drawing means.

* * * * *